United States Patent [19]
Novosel

[11] Patent Number: 5,505,624
[45] Date of Patent: Apr. 9, 1996

[54] DIGITAL TEACHING CLOCK

[76] Inventor: Elizabeth Novosel, 102 Killdeer Rd., Stephens City, Va. 22655

[21] Appl. No.: 323,126

[22] Filed: Oct. 14, 1994

[51] Int. Cl.⁶ ............................................... G09B 19/12
[52] U.S. Cl. ............................................... 434/304
[58] Field of Search .................... 434/304; 368/223, 368/78, 222

[56] References Cited

U.S. PATENT DOCUMENTS

| | | | |
|---|---|---|---|
| 2,040,421 | 5/1936 | Almquist | 368/78 |
| 3,973,339 | 10/1976 | Ueda | 368/222 |
| 4,015,346 | 4/1977 | Ogasawara | 434/304 |
| 4,128,949 | 12/1978 | Marasen, Jr. et al. | 434/304 |
| 4,427,390 | 1/1984 | Manager | 273/DIG. 30 |
| 4,478,417 | 10/1984 | Shanud-Deen | 273/DIG. 30 |
| 4,731,025 | 3/1988 | Taylor | 434/304 |
| 4,799,890 | 1/1989 | Thompson et al. | 434/304 |
| 4,979,155 | 12/1990 | Tung | 368/223 |
| 5,282,616 | 2/1994 | Stacavich | 273/DIG. 30 |

*Primary Examiner*—Jessica J. Harrison
*Assistant Examiner*—Michael O'Neill
*Attorney, Agent, or Firm*—John L. James

[57] ABSTRACT

A digital teaching clock has a base member, an analog clock face on the base member, a digital clock face on the base member with display elements, placards for mounting on the display elements, and fastener strips for detachably mounting the placards on the display elements. A student sets a time on the analog clock then attaches placards on the display elements to form a numerical equivalent of the time of day in digital format.

2 Claims, 2 Drawing Sheets

DIGITAL TEACHING CLOCK

FIELD OF THE INVENTION

The present invention relates to educational tools, and, more particularly, to a digital teaching clock for teaching young children how to tell time.

BACKGROUND OF THE INVENTION

To be functionally literate in modern society, a person needs to know how to tell time. In the past, telling time meant interpreting the numbers on the face of an analog clock to which the clock hands point to indicate the time of day. With an analog clock, portions of an hour were often referred to in quarter-hour increments, such as a quarter past two, half past two or a quarter before three. These and other terms of common usage were learned when a student was taught how to tell time. Students are still taught how to tell time, however, there are now digital clocks which do not have the hands that are present on an analog clock. Rather, they display the hour and the minutes in numbers. On a digital clock a quarter past two would be shown in digits which are simply read. The hour is two and the minutes are fifteen, therefore, it is two-fifteen, two-thirty or two-forty five as the case may be. Although digital timepieces have become increasingly commonplace over the last twenty years or so, when children are taught to tell time in school they are typically taught with an analog clock. Accordingly, it will be appreciated that it would be highly desirable to have an educational tool for teaching young children how to tell time that teaches both the analog and the digital methods of telling time.

SUMMARY OF THE INVENTION

The present invention is directed to overcoming one or more of the problems set forth above. Briefly summarized, according to one aspect of the present invention, a digital teaching clock, comprises a base member, an analog clock face on the base member, a digital clock face on the base member with display elements, placards for mounting on the display elements, and fastener strips for detachably mounting the placards on the display elements.

The digital teaching clock effectively integrates an analog clock and a digital clock and is simple to use. A student sets the time on the standard clock, then picks up the appropriate placards for the digital clock and positions them on the display of the digital clock. The learning experience is made fun by including a real-time pendulum clock which has a mouse on the pendulum. In addition, the pendulum clock may be made colorful with a gray mouse, a round gold pendulum, gold chains, fruitwood, numerals and a parchment-colored clock face. The digital teaching clock may be of compact for size for desk use or maybe class-room size for student instruction similar to blackboard instruction.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
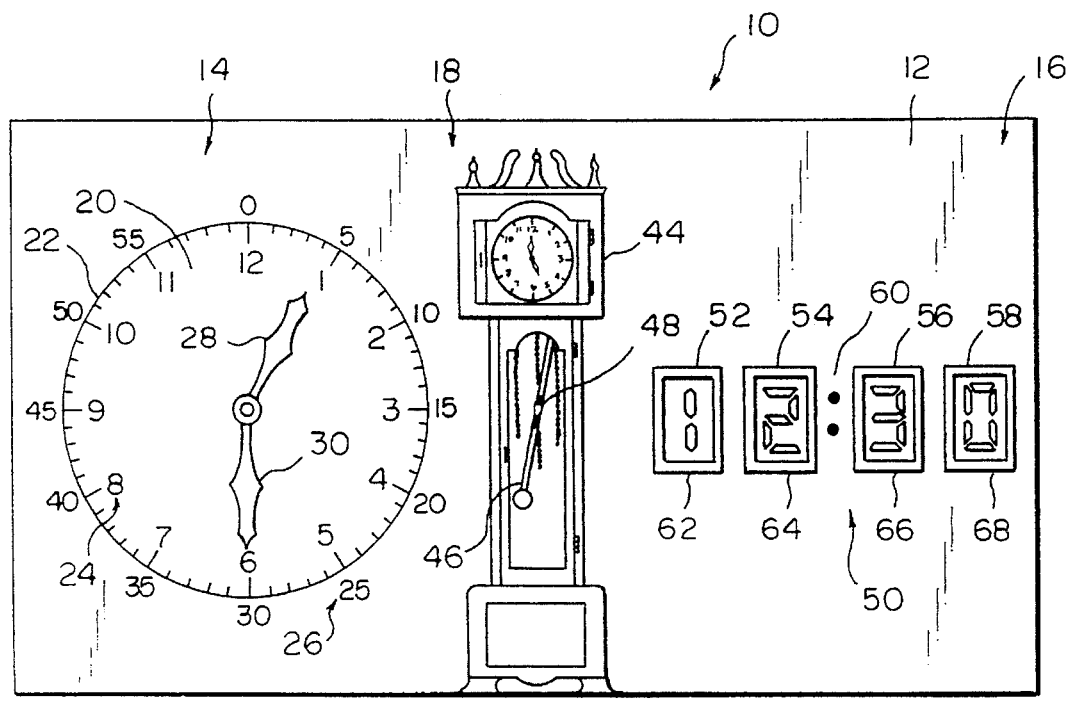
FIG. 1 is plan view of a preferred embodiment of an apparatus containing analog and digital clocks for teaching a student to tell time.

Referring to FIG. 1, a digital teaching clock 10 has a rectangular base member 12, left and right surface portions 14, 16 and a middle surface portion 18 intermediate the left and right surface portions 14, 16. As illustrated, on the left surface portion 14 of the base member 12 there is an analog clock face 20 with an outer boundary 22. Although the outer boundary 22 may be square or rectangular, a circular outer boundary is preferable because circular clock faces are very common and are believed to promote learning for young children more than other shapes.

The analog clock face 20 has a series of first indicia 24 positioned inside the outer boundary 22 for indicating different hours of the day. The first indicia 24 preferably consists of Arabic numbers 1 through 12 evenly spaced around the outer boundary 22 as is typical for an analog clock face. A second series of indicia 26 are positioned outside the outer boundary 22 for indicating minutes of an hour. The second indicia 26 are preferably Arabic numbers, in increments five, positioned about the outer boundary 22 to indicate minutes of an hour from zero to sixty minutes. As is typical for a clock, the indicia for five, ten, fifteen, and so forth correspond to the indicia hours one, two, three, and so forth. Hour and minute clock hands 28, 30 are mounted on the base member 12 inside the outer boundary 22 of the analog clock face 20. As is typical for a clock, the hour hand 28 is preferably shorter than the minute hand 30. The clock face may be the face of a clock taken from an actual time piece, may be painted or otherwise imprinted on the base member, or may be a clock face made to be applied to the base member.

Figure 2:
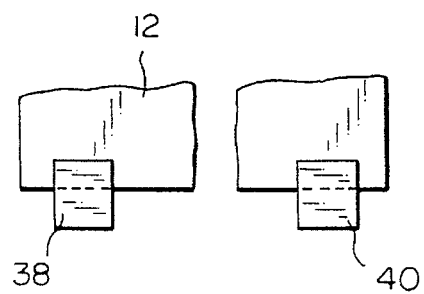
FIG. 2 is a diagrammatic plan view, similar to FIG. 1, but illustrating another preferred embodiment.
Figure 3:
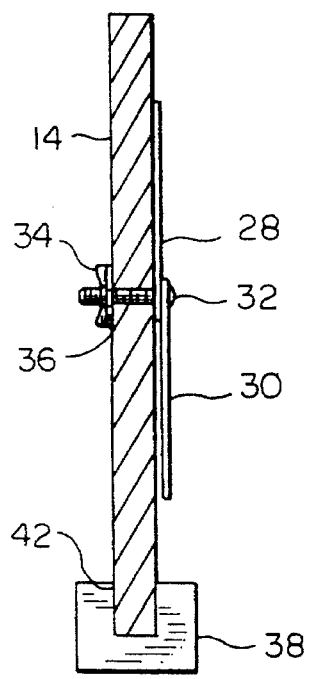
FIG. 3 is a side view of the apparatus of FIG. 2.

Referring now to FIGS. 1–3, the hour clock hand 28 is pivotally movable for manual alignment with individual indicia of the first series of indicia 24 to indicate an hour of the day, while the minute clock hand 30 is pivotally movable for alignment with individual indicia of the second series of indicia 26 to indicate a minute of the hour. The clock hands 28, 30 may be pivotally connected by any known of pivotal fastening means, but it has been found advantageous to use a threaded bolt 32, wing nut 34, and a washer 36 so that the clock hands may be easily removed and replaced. The bolt 32 preferably extends first through the hour and minute hands 28, 30 then through the opening in the base member 12 where the washer 36 can be positioned over the bolt 32 and the wing nut 34 attached. The washer 36 abuts the rear side of the base member 12 and is positioned between the base member 12 and the wing nut 34.

The digital teaching clock 10 may be of a size and construction sufficient for use by a student at a desk, in which case the bolt 32 could be reversed so that it protrudes first through the front surface of the base member 12 then the clock hands for attachment of the wing nut 34. The wing nut 34 could be recessed so that the base member 12 lies flat on a student's desk. Alternatively, the base member 12 could be supported on a student's desk by legs or other means.

The digital teaching clock 10 may also be constructed in a larger, stand-up version to be used in a manner similar to a blackboard. In such a configuration, it has been found convenient to construct the base member 10 of a piece of wood, such as plywood, approximately three feet wide and two feet high. The teaching clock is preferably supported on legs 38, 40 which may be pieces of wood approximately four inches high, two inches wide and about a foot long. Each of the legs has a groove or slot 42 therein for receiving a bottom edge portion of the base member 12 therein to thereby hold the base member 12 in a vertically upright position. The slot 42 is preferably an angled slot so that the base member 12 is held at an angle α that is greater than 90° so that the base member 12 is tilted backward slightly from the vertical. The backward tilt shifts the center of gravity of the digital teaching clock rearward to discourage the base member 12 from leaning forward during use. The leg groove 42 is positioned off-center toward the front of the leg to resist backward movement of the base member.

Again referring to FIG. 1, for indicating real time, a pendulum clock 44 with a pendulum 46 is preferably mounted on the middle surface portion 18 of the base member 12 between the analog clock face 20 and a digital clock face 50. Preferably, a toy mouse 48 is mounted on the pendulum 46. In addition to providing an indication of real time, the pendulum clock 44 is useful as an attention holding device, especially the mouse 48. Alternatively, there may be only a representation of a pendulum clock such as a color picture of a pendulum clock or a drawing of a pendulum clock on the surface of the base member. Such representations are useful when a desktop version of the digital teaching clock is desired or where compactness or portability is desired. It is preferable, however, to have a colorful clock with a gray mouse 48, a round gold pendulum 46, gold chains, a fruitwood case cabinet and a parchment colored face as these are all believed to help maintain a youngster's attention. It is also possible to make use of a freestanding existing pendulum clock by leaving enough space between the analog clock face 20 and the digital clock face 50 so that the base member 12 can be positioned behind an existing clock. Although many pendulum clocks have Roman numerals on the face, Arabic numerals are preferred because they are less confusing to young students.

Figure 4:
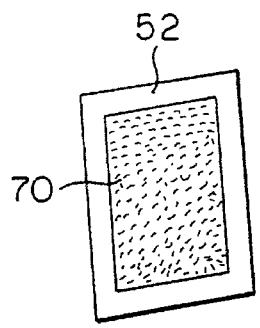
FIG. 4 is a front view of a display element of the apparatus of FIG. 1.
Figure 5:
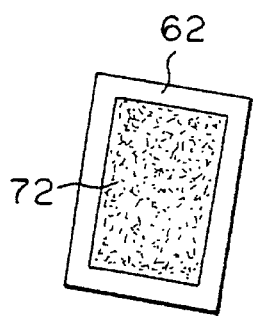
FIG. 5 is a rear view of a display placard of the apparatus of FIG. 1.

Referring to FIGS. 1, 4, and 5, the digital clock face 50 is positioned on the right surface portion 16 of the base member 12 and has a series of display elements 52, 54, 56, 58 linearly arranged. The first and second display elements 52, 54 are positioned adjacent one another for displaying daily hours and the third and fourth display elements 56, 58 are positioned adjacent one another for displaying hourly minutes. The second and third display elements 54, 56 are separated by vertical dots 60 in the form of a colon punctuation mark which is typical for separating hours and minutes in a digital clock. Display placards 62, 64, 66, and 68 are mountable on the display elements 53, 54, 56, and 58, respectively. Each of the placards has a front surface and a rear surface with the front surface having a number thereon formed of straight line segments to resemble a number on a digital display. For telling time in a standard twelve-hour format, the placards required consist of four placards with the number one thereon, three placards with the number two thereon, two zeros, three threes, etc. Each placard may be constructed of paper with a clear, plastic laminate to increase durability.

Means are provided for detachably mounting each of the placards on a respective display element. The mounting means preferably includes a first fastener strip 70 attached to the display element and a second fastener strip 72 attached to the placard with the fastener strips being mateable with one another. Preferably, the first fastener strip 70 has a surface of tiny hooks and the second fastener strip 72 has a pile surface with the surface mating and interlocking together. One such hook and pile fastener is known by the trademark VELCRO.

Figure 6:
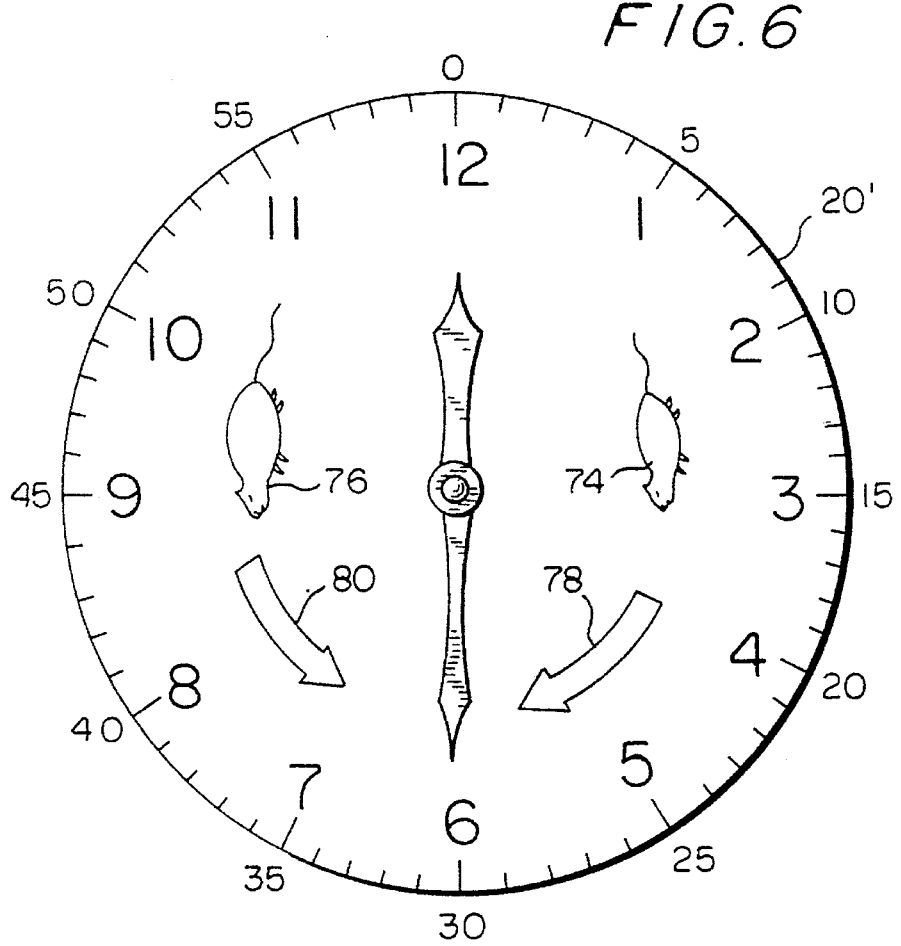
FIG. 6 shows a clock face similar to FIG. 1, but illustrating another embodiment.

Referring to FIG. 6, an analog clock face 20 is depicted for helping students learn the concepts of clockwise motion and counterclockwise motion after a student learns to tell time. Two mice 74, 76 are shown with direction arrows 78, 80. Mouse 74 is positioned to run around the clock face in a forward, clockwise direction according to arrow 78, while mouse 76 travels in a backward, counterclockwise direction according to arrow 80. Counterclockwise mouse 76 is a perfectly good mouse; he just likes to run backward—no one knows why. The mice and arrows may have adhesive backings for attachment to the clock face, but hook and pile fasteners are preferred because they removably mount the mice and arrows. The mice should be removed when teaching time telling skills to prevent distraction and make the clock face more simple. The mice may be constructed of gray colored paper and the arrows of black paper, and covered with a clear, plastic laminate.

Operation of the digital teaching clock is believed to be apparent from the foregoing description and drawings, a few words will be added for emphasis. When using the digital teaching clock, a student first sets time on the standard clock and then picks the appropriate placards for the digital clock. If a teacher wants to work in real time, the time on the pendulum clock can be used. In the blackboard version, the placards are approximately four inches high and two and a half inches wide which is an easy size for student to manipulate.

It can now be appreciated that there has been presented a digital teaching clock that is an educational tool for teaching young children how to tell time. A distinguishing feature of the educational tool is that it can be used to teach students how to read both analog clocks and digital clocks. Although digital timepieces have become increasingly commonplace over the last twenty years, when children are taught to tell time in school, they are typically taught with an analog clock. There has really been no systematic way to integrate the two kinds of devices, but the digital teaching clock effectively accomplishes this integration.

While the invention has been described with reference to the preferred embodiments, it will be understood by those skilled in the art that various changes may be made and equivalents may be substituted for elements of the preferred embodiments without departing from invention. For example, the clock hands are preferably constructed of cardboard or pressed paper material but could be made of plastic or metal. In addition, many modifications may be made to adapt a particular situation and material to a teaching of the invention without departing from the essential teachings of the present invention.

As is evident from the foregoing description, certain aspects of the invention are not limited to the particular details of the examples illustrated, for example, the hook and pile fasteners can be interchanged and operate equally well or the legs may be decorative to capture student attention. It is therefore contemplated that other modifications and applications will occur to those skilled in the art. It is accordingly intended that the claims shall cover all such modifications and applications as do not depart from the true spirit and scope of the invention.

What is claimed is:

1. A digital teaching clock, comprising:

a base member having left and right surface portions and a middle surface portion intermediate said left and right surface portions;

an analog clock face on one of said left and right surface portions, said analog clock face having an outer boundary with a series of first indicia positioned inside said outer boundary for indicating different daily hours and with a second series of indicia positioned outside said outer boundary for indicating hourly minutes;

hour and minute clock hands mounted on said base member inside said outer boundary of said analog clock face, said hour clock hand being pivotally movable for alignment with individual indicia of said first series of indicia to indicate an hour, said minute clock hand being pivotally movable for alignment with individual indicia of said second series of indicia to indicate minutes of said hour;

a digital clock face on the other of said left and right surface portions having first, second, third, and fourth display elements linearly arranged with said first and second display elements positioned adjacent one another for displaying daily hours and said third and fourth display elements positioned adjacent one another for displaying hourly minutes and with said second and third display elements separated by vertical dots in the form of a colon punctuation mark;

first, second, third, and fourth display placards for mounting on said first, second, third, and fourth display elements, respectively, each of said placards having a front surface and a rear surface, said front surface having a numeral thereon formed of straight line segments to resemble a number on a digital display;

means for detachably mounting each of said placards on said respective display elements, said means including a first fastener strip attached to said display element and a second fastener strip attached to said placard and wherein said first and second fastener strips are mateable with one another; and a pendulum clock having a pendulum and being mounted on said middle surface portion of said base member between said analog clock face and said digital clock face for indicating real time.

2. A digital teaching clock, as set forth in claim 1, including a toy mouse mounted on said pendulum.

\* \* \* \* \*